United States Patent
Brodziak

[11] Patent Number: 6,021,634
[45] Date of Patent: Feb. 8, 2000

[54] BLOCK CONNECTING LINK FOR ROUND STEEL CHAINS

[75] Inventor: Eugeniusz Brodziak, Iserlohn, Germany

[73] Assignee: Thiele GmbH & Co. KG, Iserlohn, Germany

[21] Appl. No.: 09/162,417

[22] Filed: Sep. 28, 1998

[30] Foreign Application Priority Data

Sep. 29, 1997 [DE] Germany .......................... 197 43 025

[51] Int. Cl.[7] .................................................. F16G 15/04
[52] U.S. Cl. .................................................. 59/85; 59/87
[58] Field of Search .................... 59/84, 85, 87, 59/93

[56] References Cited

U.S. PATENT DOCUMENTS

| | | | |
|---|---|---|---|
| 2,052,066 | 8/1936 | Younie | 59/85 |
| 4,035,095 | 7/1977 | Hughes, Jr. | 59/85 |
| 4,090,357 | 5/1978 | Smith | 59/85 |

FOREIGN PATENT DOCUMENTS

| | | | |
|---|---|---|---|
| 1156282 | 10/1963 | Germany | 59/85 |
| 1815409 | 6/1970 | Germany | 59/85 |
| 2813748 | 10/1979 | Germany | 59/78 |

*Primary Examiner*—David Jones
*Attorney, Agent, or Firm*—Friedrich Kueffner

[57] ABSTRACT

A block connecting link for round steel chains includes two identical stirrup-like link halves each having an essentially rectangular cross-section and a rear surface without projections, planar side surfaces, convexly curved end surfaces and receiving means for round chain links located adjacent the transverse middle plane and facing the middle plane of division between the link halves. At one end of each link half is provided a projection which protrudes beyond the middle plane of division, wherein the projection includes a convex bracket protruding at a distance toward the adjacent end surface, and at the other end of the link half a projection which also protrudes beyond the middle plane of division and has a concave recess adapted to the bracket and arranged at a distance from the adjacent end surface. Protruding from the projection with the recess in the area between the recess and the adjacent end surface is a pin with a transverse bore for a locking pin, wherein a pocket adjacent the projection with the bracket is adapted to the locking pin, wherein the pocket is located in the area between the bracket and the end surface adjacent the bracket. The principal axes of the brackets, the recesses, the pins and the pockets extend in the same direction and are inclined at the same angle relative to the transverse middle plane.

9 Claims, 4 Drawing Sheets

BLOCK CONNECTING LINK FOR ROUND STEEL CHAINS

BACKGROUND OF THE INVENTION

1. Field of the Invention

The present invention relates to a block connecting link for round steel chains.

2. Description of the Related Art

A block connecting link for round steel chains is disclosed in DE-OS 23 54 028. The block connecting link has two identical stirrup-like link halves each of which has a rectangular cross-section with a rear surface without projections, planar side surfaces and end surfaces, as well as receiving means for round chain links located next to the transverse middle planes and facing the middle plane of division between the link halves. The two link halves are coupled to each other by means of ledges having a T-shaped cross-section and provided at the end of each link half. The ledges end at a distance in front of the adjacent end surface. The coupling is further effected by T-shaped grooves provided at the other end of the link half, wherein the T-shaped grooves are open toward the transverse middle plane and are adapted to the T-shaped ledges. The relative position of the coupled linked halves is ensured by a locking pin which transversely extends at an end of the block connecting link through the block connecting link at the vertical level of the groove provided at this location and through the ledge inserted into the groove.

Because of the relatively long ledges and the grooves corresponding to the ledges, it is necessary when coupling the link halves to each other that they are offset relative to each other by the length of the ledges in longitudinal direction in order to be able to then insert the ledges into the grooves. The same displacement distance is also required when disassembling the block connecting link. However, a long displacement distance requires a correspondingly large chain link length, so that chains having a short chain link length cannot be connected by means of the block connecting link according to DE-OS 23 54 028. Chains having a short chain link length are understood in practice to be those in which the spacing t is smaller than three times the wire diameter.

In order to eliminate this deficiency it is proposed in DE-PS 26 38 443 to arrange the ledges and grooves inclined relative to the middle plane of division between the link halves of a block connecting link. It may be possible that this provides a certain improvement. However, this block connecting link can also not be used in the case of short chain link lengths because the displacement distance is still too long.

SUMMARY OF THE INVENTION

Therefore, it is the primary object of the present invention, to provide a block connecting link which facilitates coupling of round steel chains with round chain links having a short length.

In accordance with the present invention, a block connecting link for round steel chains includes two identical stirrup-like link halves, wherein each link half has an essentially rectangular cross-section and a rear surface without projections, planar side surfaces, convexly curved end surfaces and receiving means for round chain links located adjacent the transverse middle plane and facing the middle plane of division between the link halves. At one end of each link half is provided a projection which protrudes beyond the middle plane of division, wherein the projection includes a convex bracket protruding at a distance toward the adjacent end surface, and at the other end of the link half a projection which also protrudes beyond the middle plane of division, wherein the projection at the other end has a concave recess adapted to the bracket and arranged at a distance from the adjacent end surface. Protruding from the projection with the recess in the area between the recess and the adjacent end surface is a pin with a transverse bore for a locking pin, wherein a pocket adjacent the projection with the bracket is adapted in a positively engaging manner to the locking pin, wherein the pocket is located in the area between the bracket and the end surface adjacent the bracket, and wherein the pocket has transverse bores in a wall thereof for the locking pin. The principal axes of the brackets, the recesses, the pins and the pockets extend in the same direction and incline at the same angle relative to the transverse middle plane.

At the core of the invention is the fact that at each of a link half is provided a pin-type connection formed of a male part and a female part. At one end the pin-type connection is composed of a bracket and an adjacent pocket and at the other end the pin-type connection is composed of a pin and an adjacent recess. The pin-type connections located one behind the other in the longitudinal direction of the link halves make it possible that only a minimum relative displacement of the link halves is required in order to couple and uncouple two round steel chains. This makes the block connecting link according to the present invention particularly suitable for round steel chains with short link lengths. All pin-type connections contribute to the absorption of the longitudinal forces, i.e., shear stresses. As a result, a high breaking force and a high number of stress reversals can be achieved. The surfaces which are in contact with each other are prevented from sliding relative to each other by the oblique position of the brackets, recesses, pins and pockets relative to the transverse middle plane of the link halves. The angle between the principal axis of extension and the transverse middle plane is so small that the desirable small axial relative displacement of the link halves during the assembly and disassembly of a block connecting link are not impaired.

In this connection, it is particularly advantageous if the principal axes of extension of the brackets, recesses, pins and pockets extend at an angle of 3° to 5°, preferably 4°, relative to the transverse middle plane.

In view of the fact that during the assembly and disassembly of a block connecting link an inclined position of the chain end links engaged in the link halves relative to the middle plane of division between the link halves is no longer possible in the case of short chain link lengths, a particularly useful feature of the present invention provides that the transverse bores in the pins and in the walls defining the pockets are arranged on the side facing the rear surfaces in planes extending parallel to the middle plane of division and intersecting the bottom surfaces of the recesses. In this manner, the locking pins driven into the transverse bores of the pins and walls of the pockets are easily accessible because they are not covered by the chain end links. Consequently, the locking pins can be driven into and also out of the transverse bores without problems.

In accordance with another feature, the pins and pockets have oval-shaped cross-sections wherein the longitudinal axes thereof extend in the longitudinal direction of the link halves.

In accordance with another advantageous feature, the pins and the pockets have round cross-sections.

In order to facilitate the disassembly of the block connecting link, the pockets are connected through bores to the rear surfaces. It is then possible to insert into these bores a mandrel until the mandrel makes contact with the end face of a pin. By striking a hammer, it is then possible to produce a transverse load and to effect a separation of the link halves.

In order to prevent a contraction of the block connection link in the middle length portion thereof in the case of very high tensile loads, the present invention further provides that provided between the receiving means of each link half are support cams protruding toward the respectively other link half and ending in front of the plane of division. When two link halves are assembled to form a block connecting link, the distance between the frontally facing end faces of the support cams is a few tenth of a millimeter. On the one hand, this play is sufficient to ensure that all surface areas which participate in the connection come into contact with each other during the assembly and, on the other hand, it is ensured that the end faces of the support cams come immediately into contact which each other in the case of tensile loads and, thus, prevent the constriction with certainty.

In accordance with another feature, the support cams are laterally stepped. This makes it easier to separate the two link halves from each other. Using an obliquely positioned mandrel, the steps can be contacted and separating loads can be applied onto the link halves.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
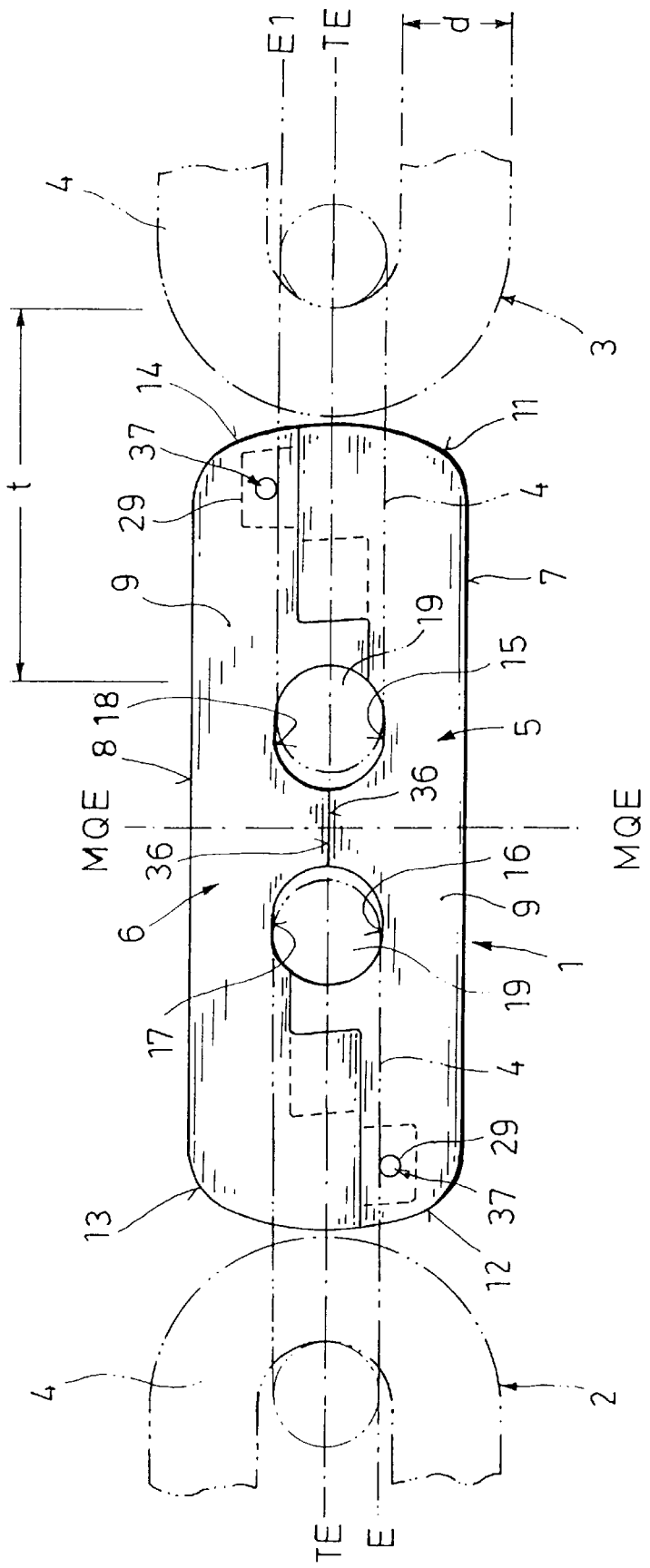
FIG. 1 is a schematic view of a block connecting link for coupling two round steel chains, shown in the assembled state.

FIG. 1 of the drawing shows a block connecting link 1 which serves to connect two round steel chains 2, 3 having round chain links 4. Each round chain link 4 has a length t of smaller than 3×d, wherein d is the wire diameter.

The block connecting link 1 includes two identical stirrup-like link halves 5, 6 which, as also shown in FIGS. 2 through 6, each have an essentially rectangular cross-section with a continuous rear surface 7, 8 without projections, planar side surfaces 9, 10, convexly curved end surfaces 11, 12; 13, 14 and receiving means 15, 16; 17, 18 for the arc-shaped end portions 19 of the round chain links 4 to be connected, wherein the receiving means are located next to the transverse middle plane MQE and face the middle plane of division TE between the link halves 5, 6.

Provided at the end of each link half 5, 6 is a projection 20 protruding over the middle plane of division TE and provided with a convex bracket 21 protruding at a distance toward the adjacent end surface 12, 14. Consequently, the bracket 21 is located on both sides of the plane of division TE. The principal axes of extension 22 of the brackets 21 extend at an angle α of 4° relative to a plane which extends parallel to the transverse middle plane MQE. Consequently, all surface areas of the bracket 21 facing the end surfaces 12, 14 also extend at this angle α. The brackets 21 are dimensioned narrower than the link halves 5, 6. The side surfaces 23 which extend parallel to each other over a certain length then extend over arc-shaped end portion 24 into the side surfaces 9, 10 of the link halves 5, 6.

At the respectively other ends of the link halves 5, 6 is provided a projection 25 which also protrudes over the middle plane of division TE. This projection 25 has a concave recess 26 which is open toward the transverse middle plane MQE, is adapted to a bracket 21 and is arranged at a distance from the adjacent end surface 11, 13. The principal axes of extension 27 of the recesses 26 also extend at an angle α of 4° relative to a plane which extends parallel to the transverse middle plane MQE.

As further illustrated in the drawing, pins 28 with transverse bores 29 protrude from the projections 25 with the recesses 26 in the area between the recesses 26 and the adjacent end surfaces 11, 13. The pins 28 have an oval cross-section, wherein the longitudinal axes extend in the longitudinal direction of the link halves 5, 6. The principal axes of extension 30 of the pins 28 also extend at an angle α of 4° relative to a plane which extends parallel to the transverse middle plane MQE. The transverse bores 29 are provided in the pins 28 in such a way that they are located on the sides facing the rear surfaces 7, 8 on the planes E, E1 which intersect the bottom surfaces of the receiving means 15 to 18 for the round chain lengths 4 and extend parallel to the plane of division TE, as particularly shown in FIG. 1.

Next to the projections 20 with the brackets 21 are provided in the ends of the link halves 5, 6 oval pockets 31 adapted to the pins 28 and located between the brackets 21 and the adjacent end surfaces 12, 14. The principal axes of extension 32 of the pockets 31 extend at an angle α of 4° relative to a plane which extends parallel to the transverse middle plane MQE. The walls 33 forming the sides of the pockets 31 are provided with transverse bores 34 which are also located on the sides facing the rear surfaces 7, 8 on the planes E, E1 which intersect the bottom surfaces of the receiving means 15 to 18 and extend parallel to the plane of division TE, as shown in FIG. 2.

Provided between the receiving means 15, 16; 17, 18 of each link half 5, 6 is a support cam 35 which projects toward the respectively other link half 5, 6. The end faces 36 of the support cams 35 are located at a distance from each other in the assembled state of the block connecting link 1 illustrated in FIG. 1.

Figure 2:
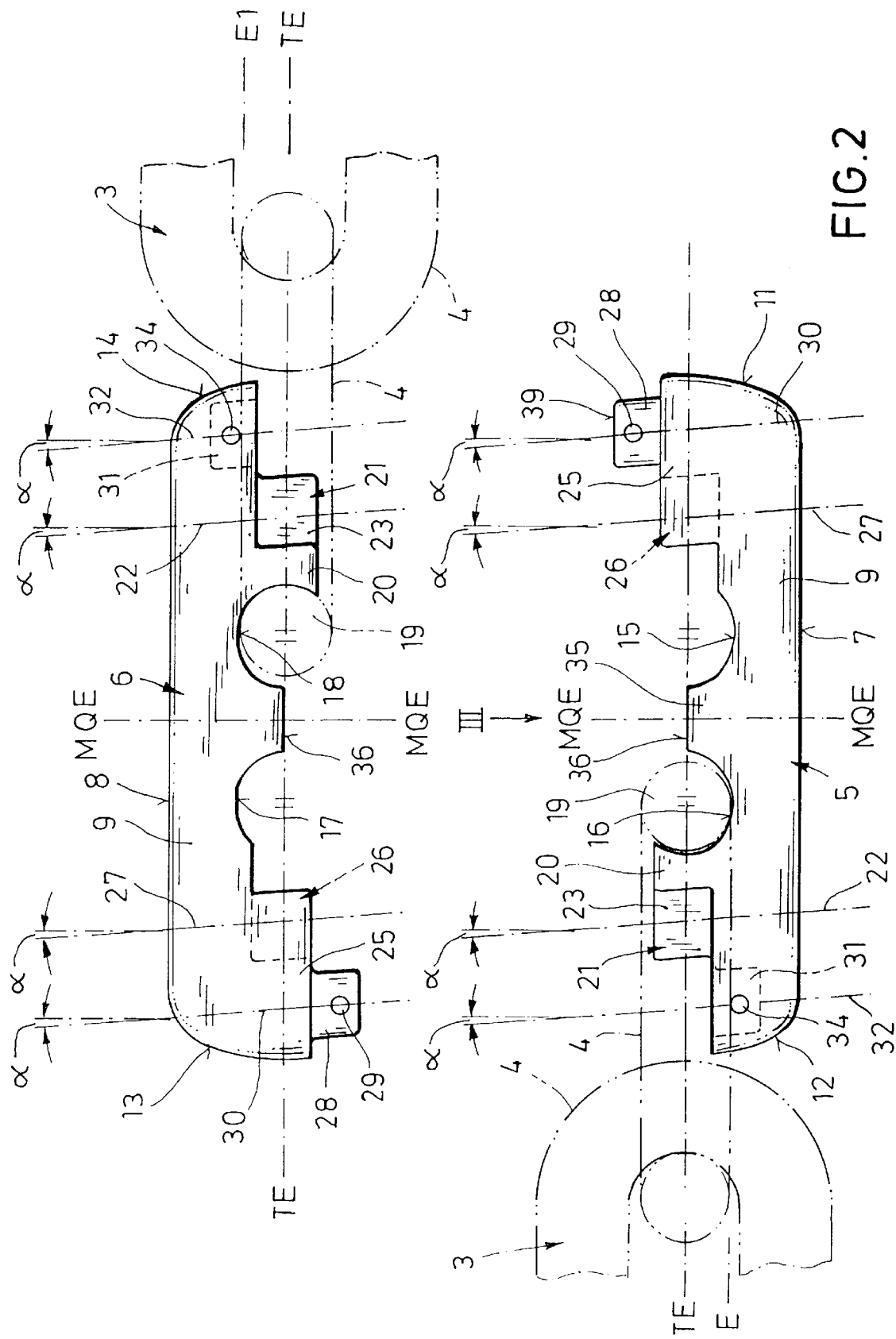
FIG. 2 shows the block connecting link of FIG. 1 during the assembly.
Figure 3:
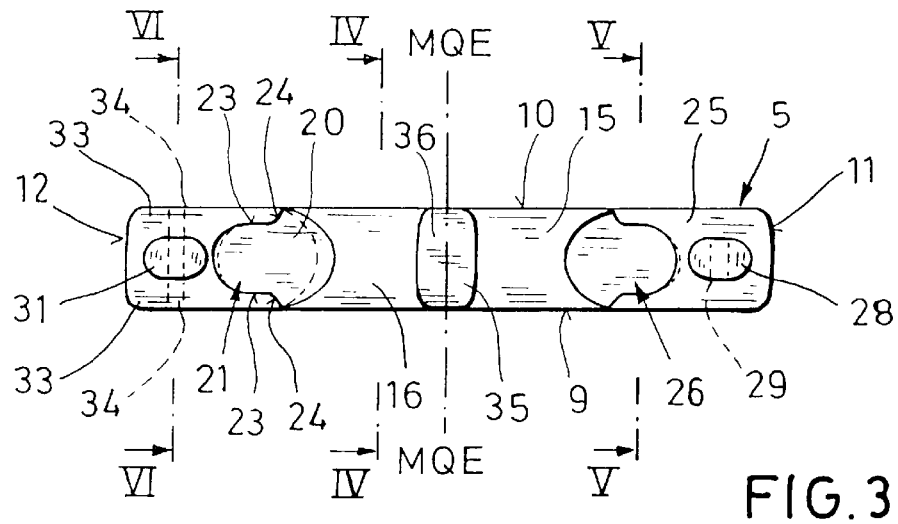
FIG. 3 is a view, on a smaller scale, of the coupling side of a link half in the direction of arrow III of FIG. 2.
Figure 4:
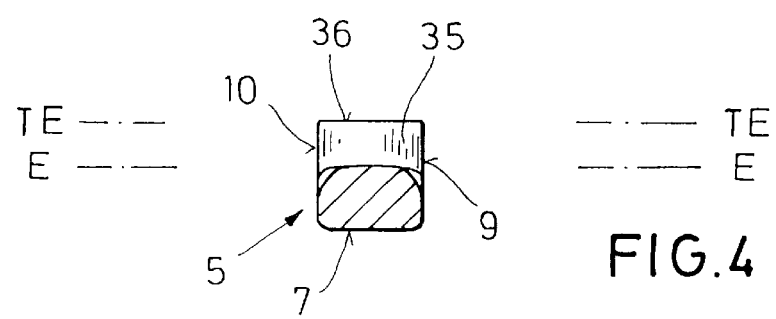
FIG. 4 is a vertical sectional view taken along sectional line IV—IV.
Figure 5:
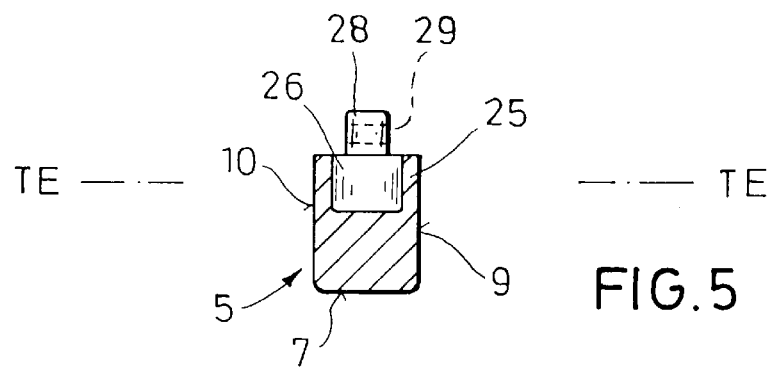
FIGS. 5 is a vertical sectional view taken along sectional line V—V.
Figure 6:
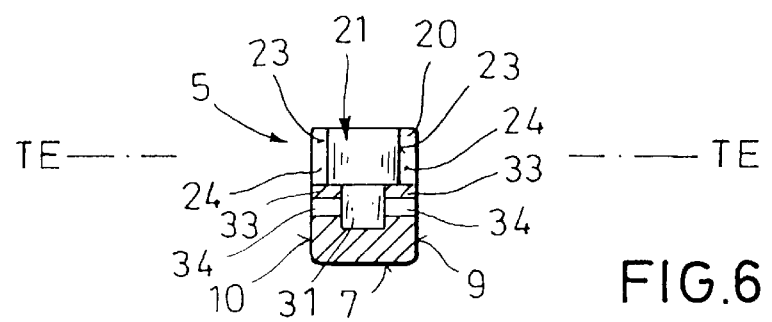
FIG. 6 is a vertical sectional view taken along sectional line VI—VI.

When the block connecting link 1 is being assembled as shown in FIG. 2, the round end chain links 4 are placed in the receiving means 15 and 18, wherein the link halves 5, 6 and the round chain links 4 are aligned axially relative to each other. The link halves 5, 6 are now joined by moving them in the transverse direction, wherein the brackets 21 slide into the recesses 26 and the pins 28 into the pockets 31. Because of the angle α between the principal axes of extension 22, 27, 29 and 32 of the brackets 21, recesses 26, pins 28 and pockets 31, respectively, relative to a plane which extends parallel to the transverse middle MQE, only a slight relative displacement of the link halves 5, 6 in the longitudinal direction is required during the assembly.

After the link halves 5, 6 have been joined, locking pins 37 are driven through the transverse bores 29, 34 of the pins 28 and of the pockets 31 and the link halves 5, 6 are locked relative to each other in this manner.

FIGS. 7 to 10 of the drawing illustrate an embodiment which, in principle corresponds to that of FIGS. 1 to 6. Accordingly, the same reference numerals are used and another explanation is not necessary.

Figure 7:
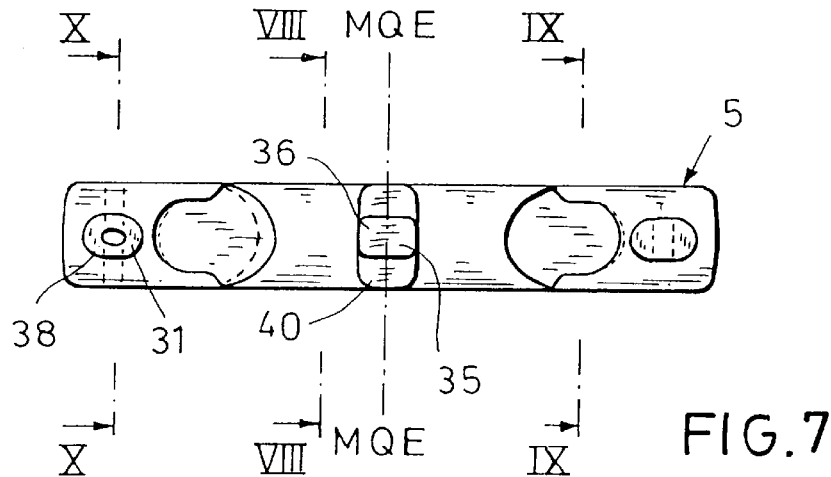
FIG. 7 is a view, on a smaller scale, of the coupling side of a link half of another embodiment in the direction of arrow III of FIG. 2.
Figure 8:
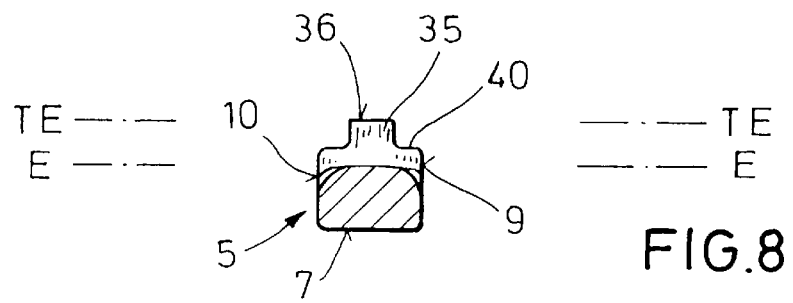
FIG. 8 is a vertical sectional view along sectional line VIII—VIII of FIG. 7.
Figure 10:
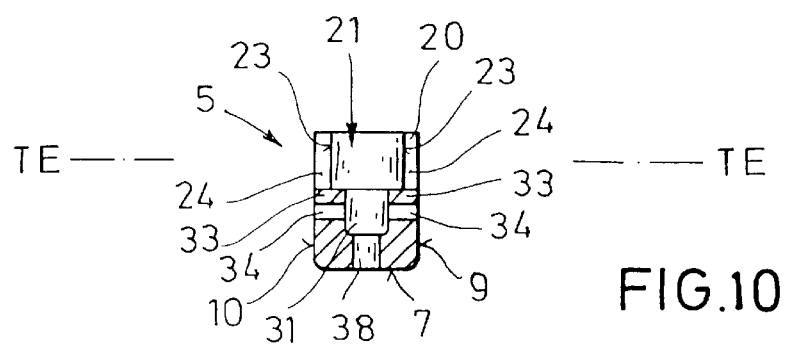
FIG. 10 is a vertical sectional view taken along sectional line X—X of FIG. 7.

However, the difference is the fact that the pockets 31 are constructed differently. As illustrated in FIGS. 7 and 10, the pockets 31 are now connected through bores 38 to the rear surfaces 7, 8.

Figure 9:
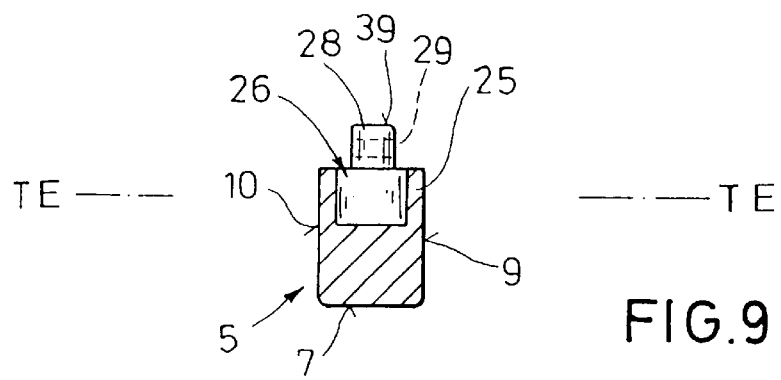
FIG. 9 is a vertical sectional view taken along sectional line IX—IX of FIG. 7.

In addition, the support cams 35 are provided with lateral steps 40, as shown in FIGS. 7 and 9.

The bores 38 as well as the steps 40 are intended to make it easier to disassemble the two link halves 5, 6 by driving mandrels through the bores 38 and bringing them into contact with the end faces 39 of the pins 28. Obliquely positioned mandrels can be applied to the steps 40 and used for driving two link halves 5, 6 apart from each other.

While specific embodiments of the invention have been shown and described in detail to illustrate the inventive principles, it will be understood that the invention may be embodied otherwise without departing from such principles.

I claim:

1. A block connecting link for steel chains, the block connecting link comprising two identical stirrup-like link halves, each link half having a transverse middle plane and a middle plane of division extending axially between the link halves, each link half having an essentially rectangular cross-section and a rear surface without projections facing away from the middle plane of division, planar side surfaces, convexly curved end surfaces and receiving means for round chain links located adjacent the transverse middle plane and facing the middle plane of division, a first end of each link half having a projection which protrudes beyond the middle plane of division, wherein the projection includes a convex bracket protruding toward an adjacent end surface, a second end of each link half having a projection which protrudes beyond the middle plane of division, wherein the projection at the second end has a concave recess having a shape adapted to a shape of the bracket and arranged spaced apart from an end surface of the second end, a pin with a transverse bore adapted for receiving a locking pin and mounted so as to protrude from the projection at the second end in an area between the recess and the end surface of the second end, a pocket formed adjacent the projection at the first end and having a shape for receiving the pin with locking engagement, wherein the pocket is located in an area between the bracket and the end surface adjacent the bracket, and wherein the pocket has a wall, transverse bores being formed in the wall adapted for receiving the locking pin, wherein the brackets, the recesses, the pins and the pockets have principal axes extending in the same direction and being inclined at an angle of inclination relative to the transverse middle plane.

2. The block connecting link according to claim 1, wherein the angle of inclination is 3° to 5°.

3. The block connecting link according to claim 1, wherein the angle of inclination is 4°.

4. The block connecting link according to claim 1, wherein the receiving means have bottom surfaces, wherein the transverse bores in the pins and in the walls of the pockets are located on sides facing the rear surfaces in planes which intersect the bottom surfaces of the recesses and extend parallel to the middle plane of division.

5. The block connecting link according to claim 1, wherein the pins and the pockets have oval cross-sections having longitudinal axes, wherein the longitudinal axes extend in axial direction of the link halves.

6. The block connecting link according to claim 1, wherein the pins and the pockets have round cross-sections.

7. The block connecting link according to claim 1, wherein the pockets are in connection with the rear surfaces through additional bores.

8. The block connecting link according to claim 1, wherein each link half has a support cam between the receiving means, the support cam of each link half protruding toward the other link half and ending in front of the middle plane of division.

9. The block connecting link according to claim 8, wherein the support cams have lateral steps.

* * * * *